US008635143B1

(12) United States Patent
Shenoy et al.

(10) Patent No.: US 8,635,143 B1
(45) Date of Patent: Jan. 21, 2014

(54) METHOD FOR DETERMINING PENETRATION OPPORTUNITY OF A DRUG INTO A PHYSICIAN MARKET

(75) Inventors: T. Ashok Shenoy, Macungie, PA (US); Niall Sweeney, Rutherford, NJ (US); Elize Dekker, Ringwood, NJ (US); Francis Chimielinski, Flemington, NJ (US); R. Peter Mallon, Wyckoff, NJ (US)

(73) Assignee: Quest Diagnostics Incorporated, San Juan Capistrano, CA (US)

( * ) Notice: Subject to any disclaimer, the term of this patent is extended or adjusted under 35 U.S.C. 154(b) by 2100 days.

(21) Appl. No.: 10/052,184

(22) Filed: Jan. 18, 2002

Related U.S. Application Data

(60) Provisional application No. 60/262,350, filed on Jan. 18, 2001.

(51) Int. Cl.
*G06Q 40/00* (2012.01)

(52) U.S. Cl.
USPC .................................................. 705/37; 705/3

(58) Field of Classification Search
USPC ............................................ 705/1, 2, 3, 4, 37
See application file for complete search history.

(56) References Cited

U.S. PATENT DOCUMENTS 5,845,255 A * 12/1998 Mayaud ............................ 705/3
2003/0036683 A1 * 2/2003 Kehr et al. .................... 600/300

* cited by examiner

*Primary Examiner* — Ojo O Oyebisi
(74) *Attorney, Agent, or Firm* — RatnerPrestia

(57) ABSTRACT

An exemplary embodiment of one aspect of the present invention provides a method of determining a penetration opportunity of a selected drug into a physician market. The method includes correlating data on laboratory tests ordered by a physician with data on drug prescriptions ordered by the physician. The method also includes determining a penetration opportunity of a selected drug based on the correlated data.

10 Claims, 13 Drawing Sheets

FIG. 1

Login | Main Menu | Comparative Drug Outcomes | Sales Force ← 100

Sales Force Targeting ← 101

Choose Reporting System: [Quad Reporting Menu ▼] ← 102

[Submit]

FIG. 2

Sales Force Targeting

Quad Reporting Menu ← 200

201 Low Prescribers, High Testers

*Click Here*

202 High Prescribers, High Testers

*Click Here*

203 Low Prescribers, Low Testers

*Click Here*

204 High Prescribers, Low Testers

*Click Here*

FIG 4

Doctor Details Report — 400
Run Date: January 12, 2001 — 401

To View Chart *Click Here* — 403

Return to Pen Opp Report *Click Here* — 402

Prescriber — 404
Lieberthal

Full Dr No — 405
10802482

Speciality — 406
Card

City, St — 407
Newark, NJ

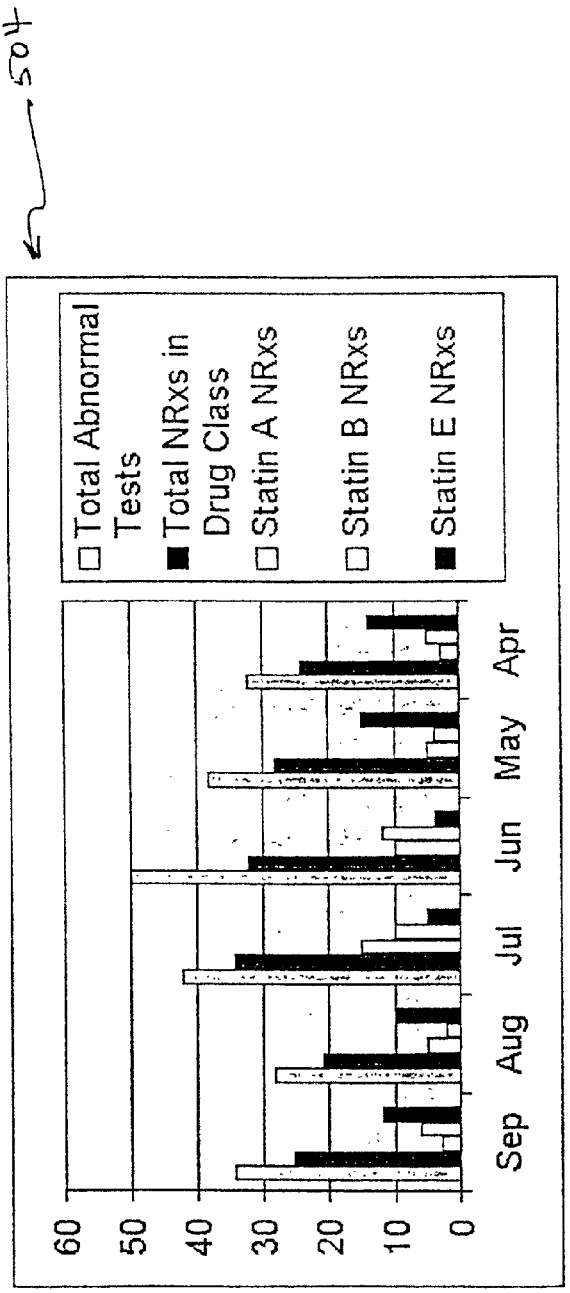

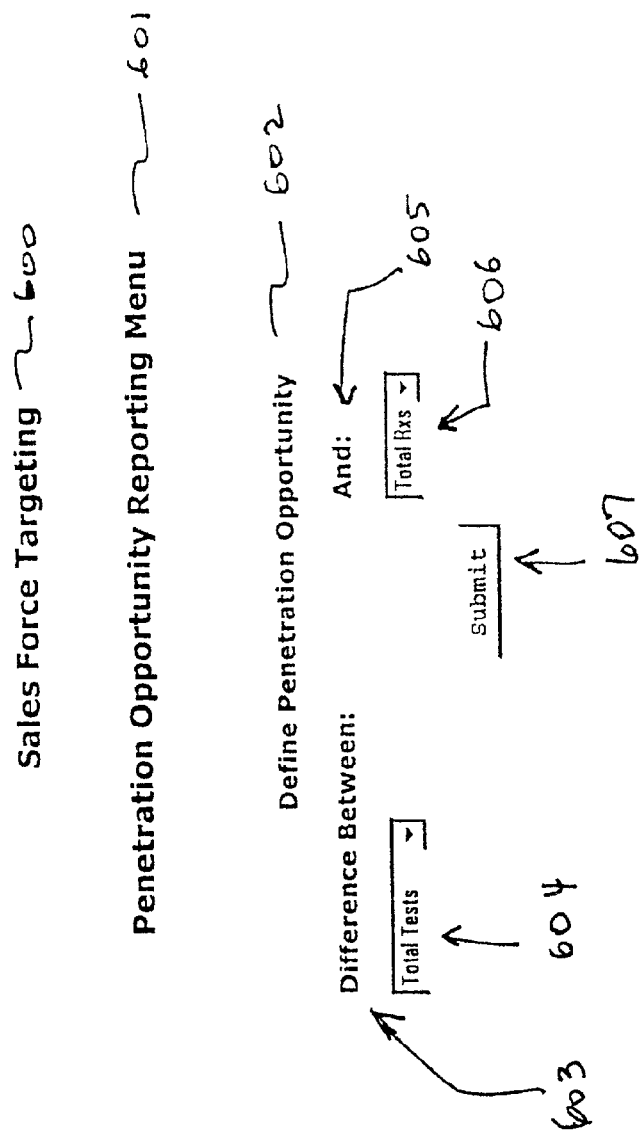

Fig 7

Penetration Opportunity Report — 700

Run Date: January 12, 2001 — 701

Difference Between Total Abnormals And Total Rxs — 702

Return to Report Menu — 703

*Click Here* — To View Chart — 704

Custom Message — 705

| Prescriber | City, St (708) | Statin Rxs (709) | Total Rxs (710) | Total Tests (711) | Total Abnml (712) | Penetration Opportunity (713) |
|---|---|---|---|---|---|---|
| Rodriguez | Englewood, NJ | 5 | 32 | 64 | 45 | 13 |
| Bernstein | Ridgefield Pk, NJ | 11 | 63 | 100 | 74 | 11 |
| Stevens | Hoboken, NJ | 19 | 99 | 128 | 110 | 11 |
| Eng | Manhattan, NY | 3 | 12 | 53 | 23 | 11 |
| Gomez | Passaic, NJ | 4 | 23 | 77 | 32 | 9 |
| Koufax | Bronx, NY | 7 | 23 | 67 | 32 | 9 |
| Brodeur | Montclair, NJ | 4 | 23 | 59 | 31 | 8 |
| Wu | Wayne, NJ | 8 | 35 | 51 | 43 | 8 |
| Jones | Ft Lee, NJ | 12 | 53 | 62 | 57 | 4 |
| Lieberthal | Newark, NJ | 7 | 47 | 63 | 51 | 4 |
| Jordan | Bloomfield, NJ | 3 | 33 | 44 | 35 | 2 |
| Williams | HoHoKus, NJ | 6 | 22 | 59 | 23 | 1 |
| Perry | Wayne, NJ | 16 | 81 | 90 | 78 | -3 |
| Washington | Morristown, NJ | 7 | 29 | 72 | 25 | -4 |
| Vazquez | Ft. Lee, NJ | 12 | 80 | 156 | 74 | -6 |
| Smith | Newark, NJ | 7 | 34 | 51 | 25 | -9 |
| Cruz | Pallisades Pk, NJ | 9 | 58 | 51 | 49 | -9 |
| Medich | Clifton, NJ | 28 | 131 | 142 | 121 | -10 |
| Alou | Passaic Pk, NJ | 4 | 52 | 60 | 41 | -11 |
| Ewing | Passaic, NJ | 12 | 79 | 110 | 68 | -11 |
| Greenberg | Brooklyn, NY | 27 | 127 | 145 | 115 | -12 |

706, 707, 714

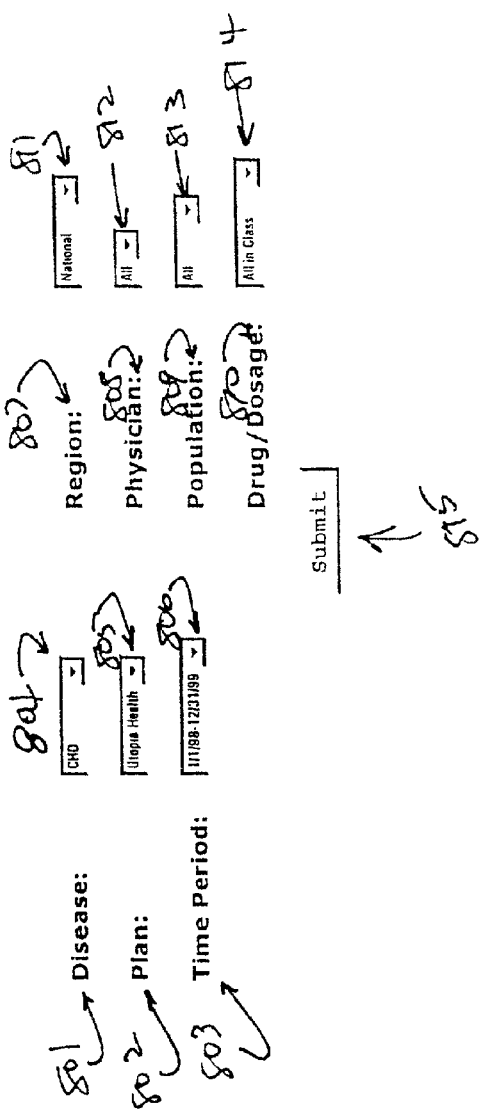

METHOD FOR DETERMINING PENETRATION OPPORTUNITY OF A DRUG INTO A PHYSICIAN MARKET

CROSS-REFERENCE TO RELATED APPLICATIONS

This application claims the benefit of U.S. Provisional Application No. 60/262,350, filed Jan. 18, 2001, the contents of which are incorporated herein by reference.

TECHNICAL FIELD

The present invention relates, in general, to a method for determining penetration opportunity of a drug into a physician market. More specifically, this invention relates to a method for determining marketing opportunity for a drug based on prescribing patterns and laboratory tests ordered by physicians.

BACKGROUND OF THE INVENTION

Pharmaceutical companies, and other manufacturers or resellers of products such as prescription drugs, often employ a sales force to sell selected drugs to physicians and other medical professionals. The sales force may be an internal sales group or a separate entity. In either case, it is desirable to maximize the sales of selected drugs, thereby maximizing the profits resulting from such sales.

It is often difficult or impossible to identify sales penetration opportunities for targeting sales efforts. The identification of such penetration opportunities would be beneficial, however, because the efforts of the sales force could be focused on specific prospects, thereby increasing the probability that a sale will be consummated.

Despite the desirability of identifying penetration opportunities, there remains a need for a method for determining penetration opportunity of a drug into a selected physician market.

SUMMARY OF THE INVENTION

To meet this and other needs, and in view of its purposes, an exemplary embodiment of one aspect of the present invention provides a method of determining a penetration opportunity of a selected drug into a physician market. The method includes correlating data on laboratory tests ordered by a physician with data on drug prescriptions ordered by the physician. The method also includes determining a penetration opportunity of a selected drug based on the correlated data.

In an exemplary embodiment of another aspect of the present invention, the method includes collecting data on drug prescriptions ordered by a physician. The method also includes providing the collected data on drug prescriptions for correlation with data on laboratory tests ordered by the physician, thereby facilitating a determination of a penetration opportunity of a selected drug based on the collected data on drug prescriptions and the data on laboratory tests.

In an exemplary embodiment of still another aspect of the present invention, the method includes collecting data on laboratory tests ordered by a physician. The method also includes providing the collected data on laboratory tests for correlation with data on drug prescriptions ordered by the physician, thereby facilitating a determination of a penetration opportunity of a selected drug based on the collected data on laboratory tests and the data on drug prescriptions.

In an exemplary embodiment of yet another aspect of the present invention, the method provides a penetration opportunity for a selected drug into a physician market using a computer network including a client computer and a central computer. The method includes receiving, at the central computer, at least one query transmitted through the network from the client computer, the at least one query including a request for information providing a penetration opportunity for the selected drug based on laboratory tests and drug prescriptions ordered by a physician. The method also includes transmitting information through the network from the central computer to the client computer, the information including data for the penetration opportunity for the selected drug based on laboratory tests and drug prescriptions ordered by the physician.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 1 is a computer screen snapshot of a page communicated to a user for prompting the user to choose a Reporting System for providing penetration opportunity data in accordance with an exemplary embodiment of an aspect of the invention;

FIG. 2 is a computer screen snapshot of a page communicated to the user for prompting the user to select one of four categories from a Quad Reporting Menu for providing penetration opportunity data in accordance with an exemplary embodiment of an aspect of the invention;

FIG. 4 is a computer screen snapshot of a page communicated to the user providing a Doctor Details Report in response to a selection made by the user to choose a Reporting System from the menu shown in FIG. 1;

FIG. 5 is a computer screen snapshot of a page communicated to the user providing Doctor Details showing penetration opportunity for a selected physician in accordance with the invention;

FIG. 6 is a computer screen snapshot of a page communicated to the user for prompting the user to select a definition for penetration opportunity in accordance with an exemplary embodiment of an aspect of the invention;

FIG. 7 is a computer screen snapshot of a page communicated to the user providing a Penetration Opportunity Report in response to the selection made by the user on the page shown in FIG. 6;

FIG. 8 is a computer screen snapshot of a page communicated to the user for prompting the user to select various choices from a menu to provide Comparative Drug Outcomes in accordance with an exemplary embodiment of an aspect of the invention;

DETAILED DESCRIPTION OF THE INVENTION

Figure 3:
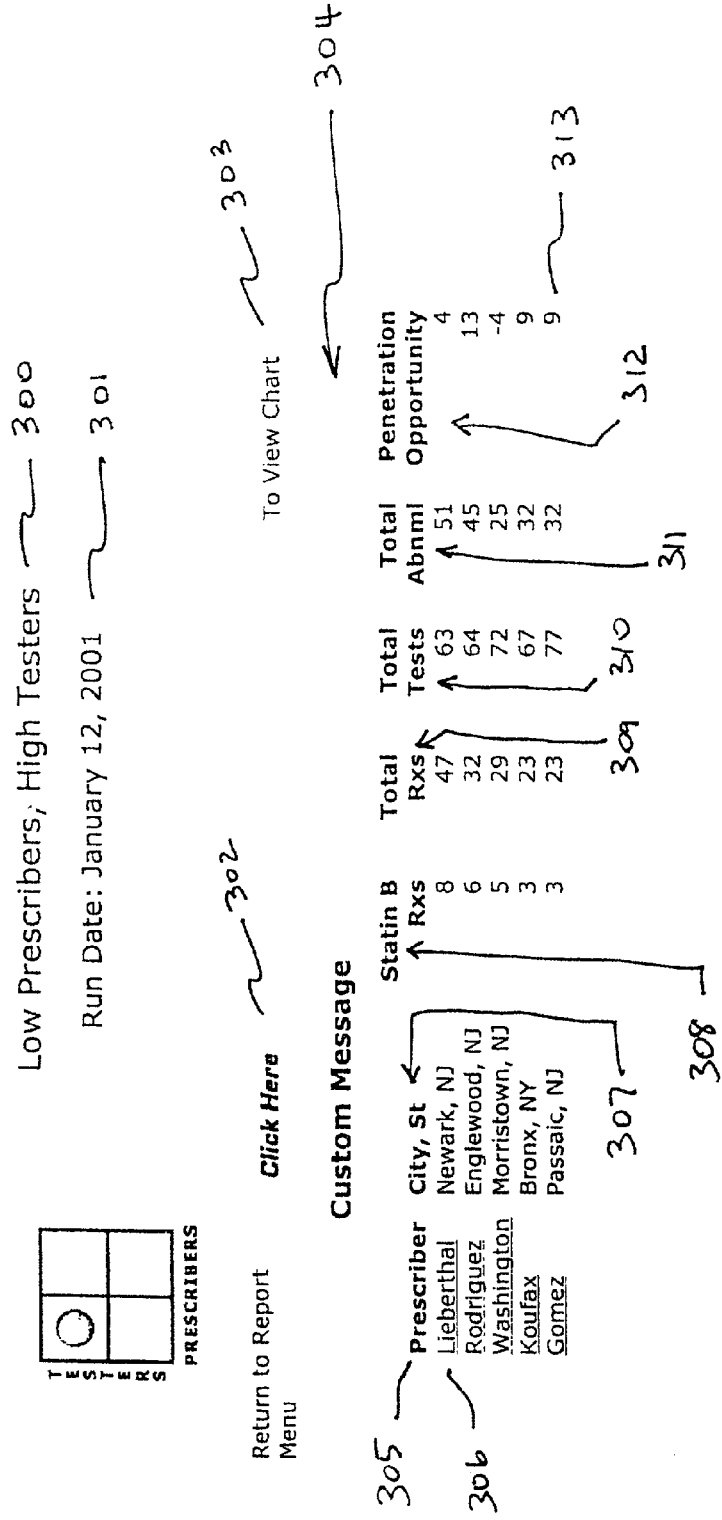
FIG. 3 is a computer screen snapshot of a page communicated to the user providing penetration opportunity data in response to a selection made by the user from the Quad Reporting Menu shown in FIG. 2.

Preferred embodiments of this invention will now be described with reference to the figures. It should be appreciated that this invention is not limited to the exemplary embodiments selected for illustration in the figures. It should also be appreciated that variations and modifications to the exemplary embodiments may be made without departing from the spirit or scope of this invention.

Generally, this invention relates to the healthcare industry, which includes medical professionals such as physicians, medical product or prescription drug suppliers such as pharmaceutical companies, and laboratory testing companies. For example, physicians examine patients and determine the need for laboratory tests. Laboratory testing companies perform medical tests as ordered by physicians. Based on the outcome of the laboratory tests, physicians treat patients using drugs that are manufactured and sold by pharmaceutical companies. Pharmaceutical companies market drugs to physicians using an internal or external sales force.

Pharmaceutical company sales force targeting of physicians can be generally based on analysis of prescribing patterns. It has been discovered, however, that it is beneficial to identify penetration opportunities by distinguishing between physicians. For example, physician A may have 100 patients and prescribes a drug for 10 of them and physician B may have 10 patients and prescribes the same drug for all 10 patients. It would be beneficial to distinguish between these two physicians A and B, and it may be difficult to distinguish them using prescription data only. Prescription data identifying physicians and patients are collected by various entities such as suppliers of prescription drugs (e.g., pharmacies) and independent prescription ($R_x$) data collectors. $R_x$ data collectors may strip the identities of the patients from the prescriptions, in order to maintain patient confidentiality, and provide physician level prescription data to provide intelligence as to the prescribing behavior of physicians.

In the field of laboratory testing, physicians request laboratory tests on behalf of their patients. A biological sample (e.g., blood, urine, culture, etc.) is taken from the patient by the physician. The biological sample is often transported to an independent laboratory, which is requested to conduct a specified test on the biological sample. The results of the test are then communicated by the laboratory to the physician. Data on such laboratory tests can be collected and compiled in order to provide intelligence as to the testing behavior of physicians.

It has now been discovered that such laboratory test data can be correlated with prescription data in order to assess penetration opportunity of a specific drug into a physician market. Correlation of such data has been discovered to provide a more comprehensive method with which to classify physicians for sales and marketing opportunities. Sales and marketing personnel are then better equipped to target selected physicians. As will be described in detail, therefore, aspects of the invention make it possible to correlate data on laboratory tests ordered by a physician with data on prescriptions ($R_x$) ordered by the physician, and, based on the correlated data, determines the penetration opportunity of a selected drug.

According to aspects of this invention, a collection of laboratory test results as well as Rx data may be made by physician, and a correlation of this data for a set period of time can be established. In the event that either the laboratory tests or the Rx data collected does not represent all data for a particular physician for the set period, statistical algorithms or other means may be used to calculate the expected overall laboratory test or drug prescription volume for that physician. Some factors that may be used in these calculations can include market share of laboratory tests or drug prescriptions of an entity or entities supplying the data.

Penetration opportunity data according to exemplary aspects of this invention may be provided to sales and marketing personnel for more efficient targeting of physicians for a selected drug. According to one exemplary embodiment, the invention provides a method that analyzes the combination of drug prescription data and laboratory test data, and links the data at the physician level. Physicians can then be categorized based on factors such as the number of laboratory tests ordered by a physician, the number of abnormal test results reported by the laboratory, and the number of prescriptions ordered by the physician in a particular disease or indication area.

According to one aspect of this invention, a method is provided for determining penetration opportunity of a selected drug into a physician market. The method is performed by first correlating data on laboratory tests ordered by a physician with data on drug prescriptions ordered by the physician. A penetration opportunity for a selected drug is then determined based on the correlated data. The correlating step optionally includes collecting data on laboratory tests ordered by the physician and/or collecting data on drug prescriptions ordered by the physician, wherein such data may be collected from another entity such as a laboratory testing company and a prescription data collector, respectively. The correlating step also optionally includes extracting data on laboratory tests in which a test result indicates the selected drug and/or extracting data on drug prescriptions ordered by the physician for a class of drugs of which the selected drug is a member.

The step of determining a penetration opportunity optionally includes determining the difference between the number of laboratory tests ordered by a physician and the number of drug prescriptions ordered by the physician. The determining step also optionally includes determining the differences between the number of laboratory tests ordered by the physician of which the results indicate abnormal health conditions and the number of drug prescriptions ordered by the physician. Accordingly, the method may include quantifying the number of laboratory tests in which a test result indicates the selected drug and quantifying the number of laboratory tests in which the test result indicates an abnormal health condition. The method may further include quantifying the number of drug prescriptions ordered by the physician for the class of drugs of which the selected drug is a member. In order to maintain patient confidentiality, an exemplary method according to this invention optionally includes removing identities of patients from the laboratory test data and/or the drug prescription data.

According to another aspect of this invention, the method can include categorizing a physician as a low prescriber or a high prescriber based on the data on drug prescriptions ordered by the physician, and categorizing the physician as a low tester or a high tester based on the data on laboratory tests ordered by the physician. The method can also include categorizing the physician as a low prescriber and a low tester, a low prescriber and a high tester, a high prescriber and a low tester, or a high prescriber and a high tester.

In another exemplary embodiment of a method according to aspects of this invention, the method can include collecting data on drug prescriptions ordered by a physician and providing the collected data on drug prescriptions for correlation with data on laboratory tests ordered by the physician, thereby facilitating a determination of a penetration opportunity of a selected drug based on the collected data on drug prescriptions and the data on laboratory tests. The collecting step can include obtaining the data on drug prescriptions from a supplier of drugs and/or removing patient information from the data on drug prescriptions.

In yet another exemplary embodiment of a method according to aspects of this invention, the method can include collecting data on laboratory tests ordered by a physician and providing the collected data on laboratory tests for correlation with data on drug prescriptions ordered by the physician, thereby facilitating a determination of a penetration opportunity of a selected drug based on the collected data on laboratory tests and the data on drug prescriptions. The collecting step can include removing patient information from the data on laboratory tests.

According to still another aspect of the invention, a penetration opportunity for a selected drug can be determined using a computer network including a client computer and a central computer. According to one exemplary embodiment, the method includes receiving, at the central computer, at least one query transmitted through the network from the client computer, wherein the query includes a request for information providing a penetration opportunity for the selected drug based on laboratory tests and drug prescriptions ordered by a physician. The method also includes transmitting information through the network from the central computer to the client computer, wherein the information includes data for the penetration opportunity for the selected drug based on laboratory tests and drug prescriptions ordered by the physician. Optionally the method also includes the step of correlating data on the laboratory tests and drug prescriptions ordered by the physician.

Figure 10:
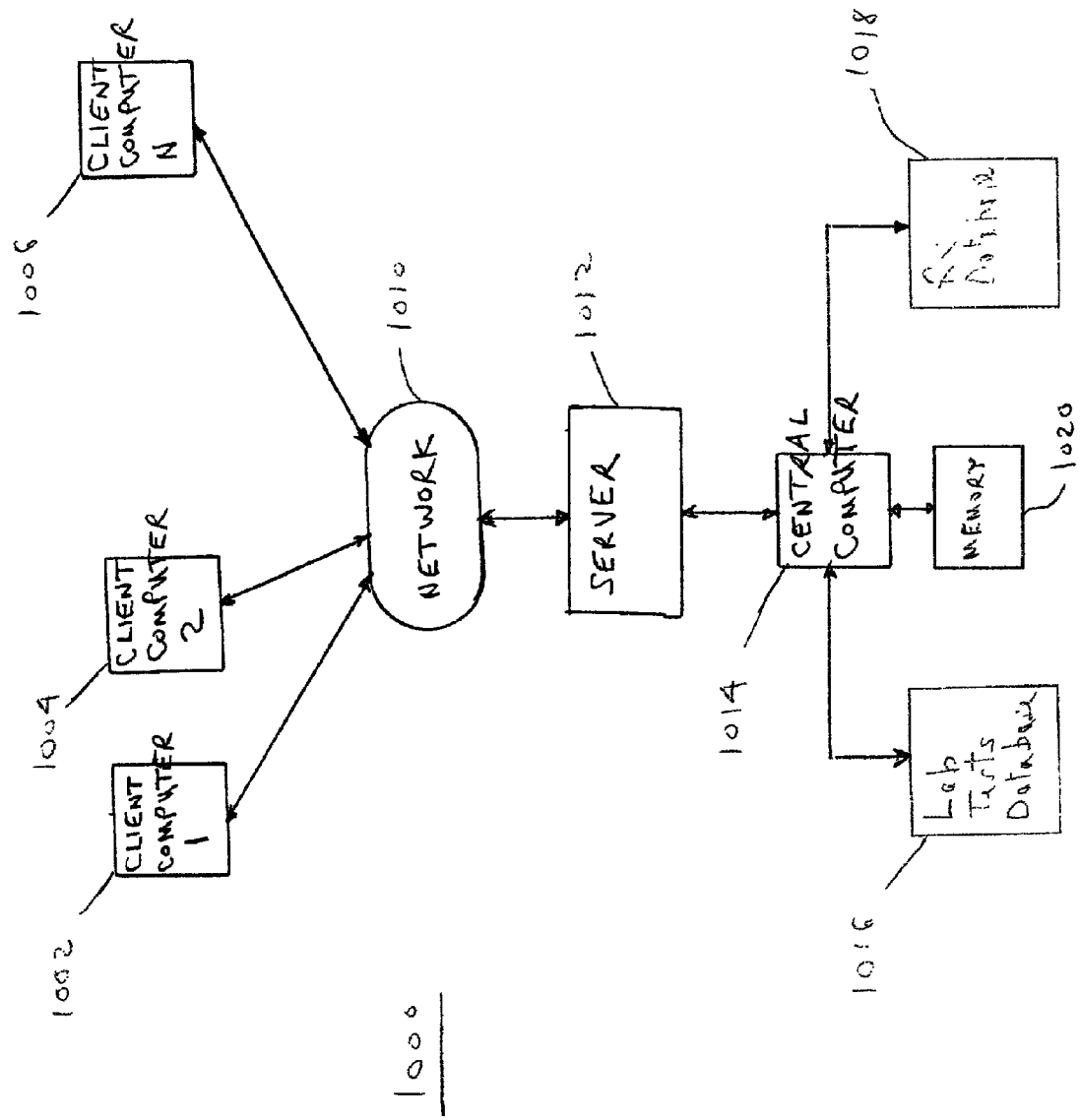
FIG. 10 is a block diagram of an exemplary embodiment of a computer network system in accordance with aspects of the present invention.

Exemplary details of selected embodiments of the invention will now be described. With reference to FIG. 10, a computer network system, generally designated as 1000, includes at least one client computer from which a subscriber, or user, may obtain penetration opportunity data by communicating with a central computer 1014. As shown, client computers 1, 2, N, designated respectively as 1002, 1004, 1006, are each interconnected by way of a network 1010 and a server 1012 to central computer 1014. Network 1010, for example, may be the Internet or a local network.

The Internet includes a vast number of computers and computer networks that are interconnected through communications links. The interconnected computers exchange information using various services, such as electronic mail, Gopher, and the World Wide Web (WWW). The WWW service allows a server computer system (i.e., Web server or Web site) to send graphical Web pages of information to a remote client computer. The remote client computer can then display the Web pages. Each resource (e.g., computer or Web page) of the WWW is uniquely identifiable by a Uniform Resource Locator (URL). To view a specific Web page, a client computer specifies the URL for that Web page in a request (e.g., a HyperText Transfer Protocol (HTTP) request). The request is forwarded to the Web server that supports the Web page. When that Web server receives the request, the server sends the Web page to the client computer. When the client computer receives the Web page, the computer typically displays the Web page using a browser. A browser is a special-purpose application program that affects the requesting of Web pages and the displaying of Web pages.

Web pages are typically defined using HyperText Markup Language (HTML). HTML provides a standard set of tags that define how a Web page is to be displayed. When a user indicates to the browser to display a Web page, the browser sends a request to the server computer system to transfer to the client computer an HTML document that defines the Web page. When the requested HTML document is received by the client computer, the browser displays the Web page as defined by the HTML document. The HTML document typically contains various tags that control the displaying of text, graphics, controls, and other features. The HTML document may contain URLs of other Web pages available on that server computer system or other server computer systems.

Although the World Wide Web is conducive to conducting electronic communication of information, other forms of electronic and conventional communication are suitable for providing penetration opportunity information according to exemplary aspects of this invention. The manner in which the penetration opportunity information is generated is independent of the manner in which the data is collected for determining the penetration opportunity information and is independent of the manner in which the penetration opportunity information is communicated to a sales force or other user.

As will be described in greater detail, a user of a client computer, such as client computers 1002, 1004, and 1006, may be a pharmaceutical company, a pharmacy, a supplier of prescription drugs or other medical products, or another entity desiring to market a selected drug or product to physicians or other health professionals who are licensed to prescribe such products to patients. The user may be part of a sales force tasked to market the selected drug. The user may become a client by subscribing to use the method of the invention.

Generally, an exemplary embodiment of this invention provides a Web- or network-based method to obtain sales targeting direction based on analysis utilizing a combination of drug prescription data and laboratory test data, including abnormal test results. This invention makes it possible for a user to obtain sales targeting direction data or penetration opportunity data.

The user of the client computer may access central computer 1014 in real time. The user, using a Web browser function in the client computer, may send a specific URL (universal resource locator) to the Web server. The Web server may fetch a log-in page from memory (not shown) and send the page to the client computer. After the user logs in with the correct user name and user password or identification, the Web server may send sales force targeting information to the user. In one exemplary embodiment of the invention, the information or data sent to the client computer may be in various formats depending on the menu-driven, graphical-user-interface of the computer program. Exemplary details of page formats sent from the central computer to the client computer will be explained later with reference to FIGS. 1-9.

Central computer 1014 communicates with two databases. A first database, generally designated as 1016, includes a collection of reports relating to laboratory tests ordered by physicians, or other health professionals. Each laboratory test report may include a patient's name; a physician's name, identification and office location; a patient's diagnosis; and laboratory test results, indicating whether a test result is normal or abnormal.

A second database, generally designated as 1018, includes a collection of data relating to prescriptions ordered by physicians, or other health professionals. Each prescription may include a patient's name; a physician's name, identification, and office location; name of the prescribed drug, generic or brand name; and quantity of prescribed drug.

It will be appreciated that laboratory tests database 1016 and $R_x$ database 1018 may reside in separate memory storage devices or in one memory storage device. In one exemplary embodiment, the $R_x$ database may be located remotely from central computer 1014. For example, the $R_x$ database may reside at a remote entity tasked to collect and form the $R_x$ database. One such entity, collecting and forming an $R_x$ database, is NDC Health of Atlanta, Ga.

Although not shown in FIG. 10, central computer 1014 may communicate with $R_x$ database 1018 by way of a computer network. $R_x$ data may be downloaded periodically or upon request from remote $R_x$ database 1018 into a local memory 1020. Similarly, laboratory tests database 1016 may be located locally or remotely from central computer 1014.

Figure 11:
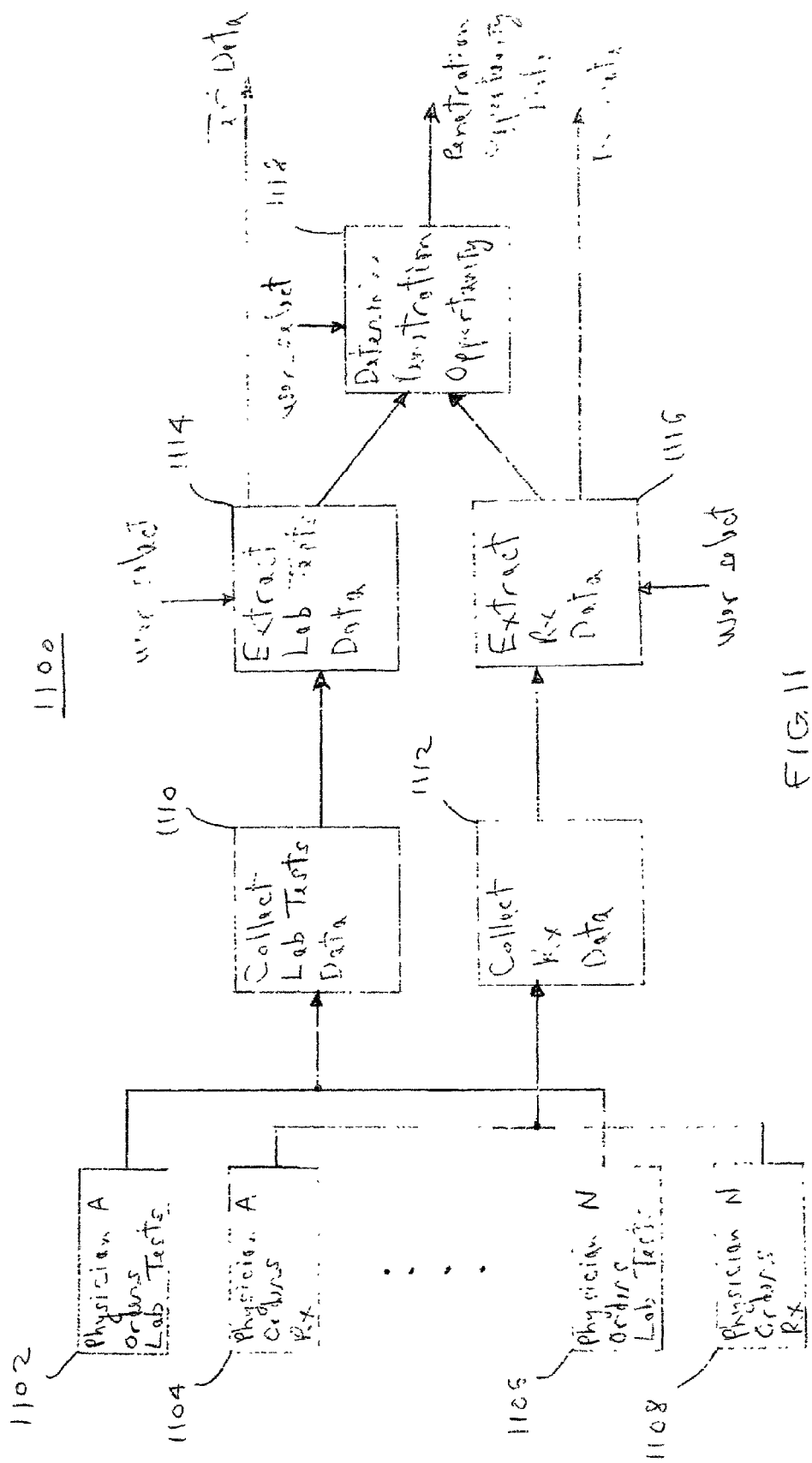
FIG. 11 is a flowchart diagram illustrating an exemplary embodiment of a method of correlating laboratory test data with drug prescription data for determining penetration opportunity in accordance with aspects of the present invention.

FIG. 11 depicts a functional logic flow diagram of an exemplary embodiment of a method according to aspects of the invention, wherein the method is generally designated as 1100. As shown, a physician A orders laboratory tests and prescribes drugs for patients (steps 1102 and 1104). Other physicians, such as a physician N, routinely order laboratory tests and drugs for their patients (steps 1106 and 1108). The physician may order a laboratory test in a variety of ways, such as by an electronic order by computer, mail order by carrier service, or personal delivery of the order by the patient.

An example of a computer on-line laboratory test ordering method available to physicians is described in U.S. application Ser. No. 09/784,889, filed on Feb. 16, 2001, which is incorporated herein by reference. For example, a patient may visit a physician's office or a hospital. Specimens, such as blood and urine, are collected from the patient. The physician, using a computer, can order a test via the Internet by sending a request to a performing laboratory, such as Quest Diagnostics Incorporated. Upon successful communication of the test order, the performing laboratory can generate a requisition for the test and specimen labels. The labels include information correlating the specimen to the patient and the test requisition. For example, the labels can include the patient's name, a physician's identification number, a requisition number, and a machine-readable code (e.g., a barcode). The requisitions and specimen labels can be sent to the physician's computer and printed by a local printer connected to the physician's computer. The printed label is placed on the specimen collected from the patient to identify the specimen. The specimen is accompanied by the printed requisition and transported to the laboratory for testing. The performing laboratory receives the specimen and performs the test. The results of the tests are sent to a central computer, either manually or by instrument merge. The central computer (or a computer at the performing laboratory) interprets the test results and provides an alert or an abnormal flag to the attention of the doctor in the event that the test report includes test results that do not fall within a predetermined "normal" range.

In response to a test report, a physician may prescribe one or more drugs for treatment of abnormal conditions. When a physician orders a drug for a patient, the prescription is typically filled by a pharmacy or other supplier of prescription drugs. The order for the drug may be requested electronically, filled by the pharmacy, and mailed to the patient. The order may also be filled by the pharmacy upon the patient providing the prescription to the pharmacy. Either way, the pharmacy maintains a record of each prescription, including such information as the patient's name, the physician's name and identification, and the name and quantity of drug provided to the patient.

Returning to the exemplary embodiment of FIG. 11, the method includes collecting laboratory test data in step 1110. As discussed, laboratory test data may be collected and stored in database 1016 (FIG. 10). The test data may include information such as the name or identification of each test ordered, the result of each test, a diagnosis, and the identity of the physician and patient. The identity of the patient is optionally redacted or otherwise extracted from the test data in order to maintain patient confidentiality. Step 1110 may directly collect this data as part of the operation of a performing laboratory, such as Quest Diagnostics Incorporated. Alternatively, step 1110 may obtain or otherwise collect the data from other remote performing laboratories or sources of such information and store the data in a local memory. For example, if step 1110 is performed by a testing laboratory, that step may involve the compilation of data already in the possession of the testing laboratory. Alternatively, if step 1110 is performed by an entity other than a testing laboratory (e.g., a pharmaceutical company, a company collecting prescription data, a sales company, or other entity), then that step may involve the collection of data from a testing laboratory.

Prescription data are collected in step 1112. The data may be collected and stored in database 1018 (FIG. 10) and may include information such as the generic and brand name of each drug prescribed by a physician, the quantity of drug prescribed, the physician's name and identification, and the patient's name. The identity of the patient may be redacted or otherwise eliminated in order to maintain patient confidentiality. The data may be obtained directly by each pharmacy and provided for collection to an $R_x$ data provider. The $R_x$ data provider may then transmit the data to central computer 1014 (FIG. 10) for storage in a local memory. Alternatively, the prescription data can be retained by the prescription data provider. Also, a pharmaceutical company or a sales force may obtain the prescription data directly from the supplier of prescription products.

Having collected laboratory test data and $R_x$ data, method 1100 may now be used to extract relevant laboratory test data and relevant $R_x$ data (steps 1114 and 1116) in response to a user selection made by way of network 1010 (FIG. 10). As will be explained, the user may select from several formats for reporting relevant data. For example, the user may select a sales territory, and may desire to obtain marketing direction only for physicians within the selected sales territory. The user may alternatively select data showing only physicians who are high prescribers of a certain class of drugs. The user may also select data showing physicians who are high volume testers of a specific disease. The user may select data showing physicians who are, in combination, high prescribers of a class of drugs and high testers of a specific disease. The user may optionally select data showing the testing and prescribing habits of one specific physician with respect to a specific disease. The user may also select data showing physicians who ordered laboratory tests that indicate abnormal health results for a disease, and so on. The collection, extraction and/or integration of relevant data from the database or combination of databases are also referred to herein as the correlation of data.

In response to the selection made by the user, the method extracts the relevant data in steps 1114 and 1116, and communicates the data to the user by way of network 1010 (FIG. 10). In addition, the method analyzes the extracted data and determines a penetration opportunity of a target drug into the physician market (step 1118). As will be explained, the manner in which penetration opportunity is determined may also be based on user selection. For example, the user may select penetration opportunity to be defined as the numerical difference between total number of tests ordered by a physician and the total number of prescriptions ordered by the same physician for a specific disease or indication. In another example, the user may select penetration opportunity to be defined as the numerical difference between the total number of prescriptions ordered by the physician and the total number of test results for that physician indicating abnormal health conditions. Generally, a large numerical value for penetration opportunity may indicate a greater marketing opportunity for the user than a small numerical value.

Figure 12:
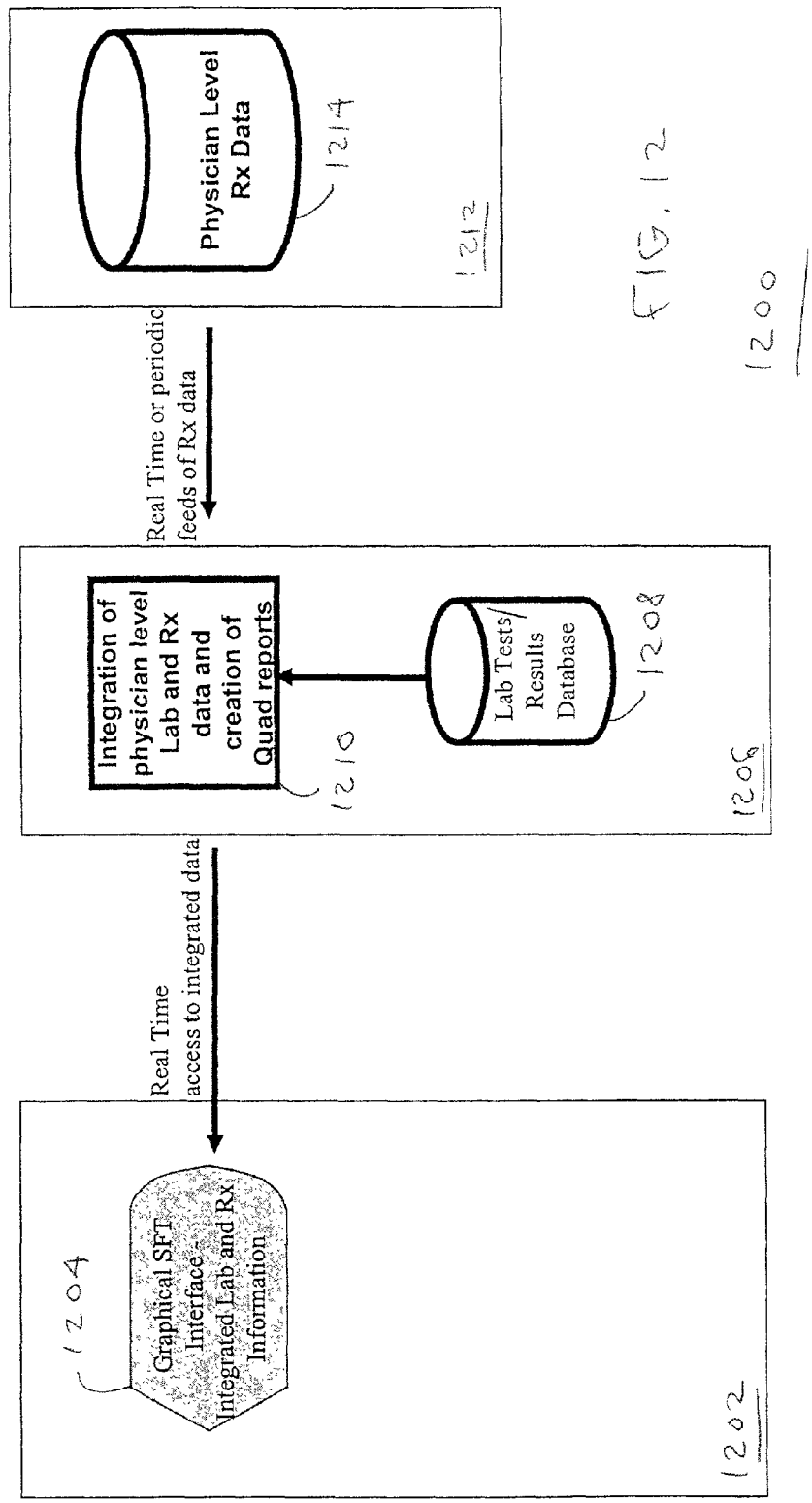
FIG. 12 is a flowchart diagram illustrating an exemplary embodiment of a method for integrating laboratory test data with drug prescription data to provide penetration opportunity data to a user in accordance with aspects of the present invention.

It will be appreciated that the invention contemplates various systems for collecting and integrating laboratory test data and $R_x$ data. In the exemplary embodiment of FIG. 12, system 1200 includes a user or sales force location 1202, a data integration location 1206, and an $R_x$ data provider location 1212. The locations 1202, 1206, and 1212 are optionally proximal one another, integrated into the same system, or remote from one another. If remote, the locations 1202, 1206, and 1212 can be connected via a network such as a local network or the Internet.

In one exemplary embodiment, prescription data is provided by a prescription data provider at location 1212 to a laboratory testing company at location 1206. In turn, integrated prescription and laboratory test data is provided by the laboratory testing company at location 1206 to a pharmaceutical company at location 1202.

The $R_x$ data provider at location 1212 maintains a database 1214, which includes physician-level $R_x$ data ($R_x$ data stripped of patient identities to maintain confidentiality). Per an arrangement between data integration location 1206 and $R_x$ data provider location 1212, $R_x$ data is provided in real-time, continuously, or in periodic intervals to an integrator 1210. Integrator 1210 maintains a database 1208 including laboratory tests and test result data. Integration of physician-level $R_x$ data and laboratory tests/results data may be performed by central computer 1014 (FIG. 10), which may be located at data integration location 1206. Real time or other periodic access to integrated laboratory tests/results data and $R_x$ data can be provided to the user at location 1202 by way of a menu-driven, graphical user interface 1204.

Figure 13:
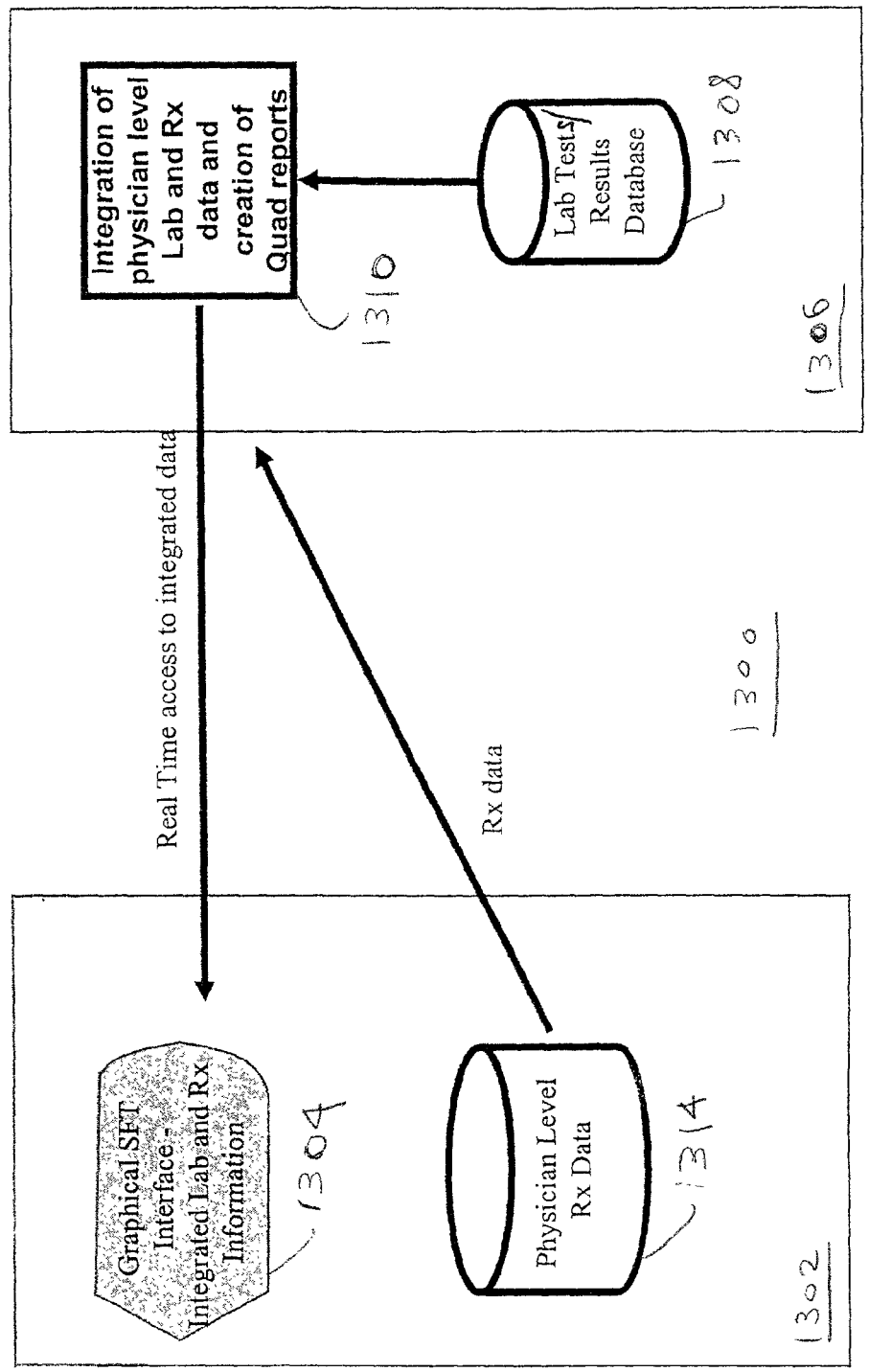
FIG. 13 is a flowchart diagram illustrating yet another embodiment of a method for integrating laboratory test data with drug prescription data to provide penetration opportunity data to the user in accordance with aspects of the present invention.

In the exemplary embodiment of FIG. 13, system 1300 includes a user or sales force location 1302 and a data integration location 1306. Location 1302 may be part of a pharmaceutical company having an $R_x$ database 1314 and a sales force. Per an arrangement between data integration location 1306 and the pharmaceutical company at location 1302, $R_x$ data is provided in real-time, continuously, or in periodic intervals, to an integrator 1310 at location 1306. Integrator 1310 maintains a database 1308 including laboratory tests and test results data. Integration of physician-level $R_x$ data (received from location 1302) and laboratory tests/results data may be performed by central computer 1014 (FIG. 10), which may be located at data integration location 1306. Real time access to integrated laboratory data and $R_x$ data is provided to the user at location 1302 by way of menu-driven, graphical user interface 1304.

According to one exemplary embodiment of system 1300, the data integration location 1306 is a laboratory testing company and the user or sales force location 1302 is a pharmaceutical company. Prescription data is provided by the pharmaceutical company at location 1302 to the laboratory testing company at location 1306 for integration with laboratory test data. The integrated prescription and laboratory test data is then provided by the laboratory testing company at location 1306 to the pharmaceutical company at location 1302.

Turning next to the menu-driven, graphical user interface, exemplary embodiments illustrated in FIGS. 1-9 will now be described. It will be appreciated that FIGS. 1-9 are illustrative in nature and are not intended to limit the method of the invention.

FIG. 1 illustrates a main menu for selection of a Sales Force Targeting report. In the illustrated embodiment, the system is presented in the form of a menu-driven hypertext-linked computer program. System menu 100 presents choices of 1) a "Login" option for a registered user, 2) a "Main Menu" option for a description of the Sales Force Targeting benefits and advantages, 3) a "Comparative Drug Outcomes" option for the Comparative Drug Outcomes main menu, and 4) a "Sales Force" option for the Sales Force Targeting main menu.

Title 101 "Sales Force Targeting" presents two menu choices 102 for the report, either a Quad Reporting Menu (shown) or a Penetration Opportunity Reporting Menu.

FIG. 2 is an example resulting from a selection of the Quad Reporting Menu. Title 200 "Quad Reporting Menu" is descriptive of the selected Sales Force Targeting menu. Under the Quad Reporting Menu, a user may select one of four categories 201 through 204 to segregate physicians under consideration. Each category 201 through 204 is based on a different combination of laboratory tests ordered and drugs prescribed: 1) Low Prescribers, High Testers 201; 2) High Prescribers, High Testers 202; 3) Low Prescribers, Low Testers 203; and 4) High Prescribers, Low Testers 204.

Selection of one of these four categories 201 through 204 retrieves information corresponding to the selected criteria. For example, selection of category 202 will result in the retrieval of information relating to physicians that order a large number of drug prescriptions and a large number of laboratory tests.

FIG. 3 is an example of a selection of Low Prescribers, High Testers 201 from the Quad Reporting Menu 200 illustrated in FIG. 2. Title 300 "Low Prescribers, High Testers" is descriptive of the category selected. Beneath the title 300, run date 301 for the correlated data is displayed. There are options to return to Report Menu 302 and to view a chart for compared data 303.

The retrieved information is displayed in column format. Column 305 lists the names 306 of the prescribing physicians. An adjacent column (not shown) may be used to show a corresponding identification number for each physician. Column 307 displays each physician's address. Column 308 shows the number of prescriptions of a specific drug under inquiry ("Statin B" in this example). The name of the specific drug may be at the top of the column with the number of prescriptions for each corresponding physician below the top of the column. Column 309 displays the total number of prescriptions of drugs in the same therapeutic class as the specific drug that were ordered by each listed physician. Column 310 shows the total number of tests ordered by the physician for the specific related disorder or disease. Column 311 shows the total number of test results that registered as abnormal. Column 312 displays a Penetration Opportunity determined based on the definition set by the user (described in greater detail later in connection with FIG. 6). The selected Quad Report is denoted at the top of the page both by title 300 and by a graphical diagram, which illustrates a particular quadrant, based on high or low "TESTERS" and "PRE-SCRIBERS."

Based on the selected Quad Report, a custom message 304 for the sales force may be prominently displayed in the center of report. For example, the selection of the "Low Prescribers, High Testers" Quad Report may show that half of the physicians in a sales territory have a large potential for penetration. Custom message 304 may state, for example, "Remind physician of the national guidelines in treatment of this disease and reinforce the fact that brand X is superior to brand Y."

A Doctor Details Report, as shown in FIG. 4, may be selected for any one of the physicians 306 listed under prescriber column 305 of the Quad Report. Title 400, Doctor Details Report, is descriptive of the particular physician name selected. Beneath the title, run date 401 of the correlated data is displayed.

Options are available to return to Report Menu 402 or to View Chart 403 (FIG. 5) containing information on diagnostic test results and prescriptions for the related disease. Information on the physician may be displayed in column format. Column 404 lists the names of the prescribing physicians. Column 405 displays each physician's identification number. Column 406 displays an area of practice for each physician (i.e., a specialty), and column 407 displays each physician's address. Additional columns may follow, if necessary, to further identify a physician.

FIG. 5 displays a sample chart 403 for the physician selected from the Doctor Details Report illustrated in FIG. 4. Title 500, "Doctor Details," is descriptive of the data presented on the page. Beneath the title is a run date 501 of the report. The page also provides an option 502 to return to the previous page (the Doctor Details Report illustrated in FIG. 4).

Title 503 for the data displayed in FIG. 5 is descriptive of the diagnostic tests, the particular drugs under inquiry, and the physician who ordered them. Graphical representation of data 504 is displayed in a format selected by the user for a desirable span of time.

FIG. 6 illustrates a second option available from the Sales Force Targeting Menu; namely, the Penetration Opportunity Reporting Menu. Title 601 "Penetration Opportunity Reporting Menu" is shown toward the top of the page. Title 602, "Define Penetration Opportunity," prompts the user to select two parameters defining an algorithm for calculating the sales penetration opportunity. The first parameter 603, "Difference Between," is chosen from a menu 604. Menu 604 defines the laboratory tests used in the determination of penetration opportunity. There may be two or more possible choices from this menu. For example, the user may be invited to select between: 1) Total Tests (shown), which uses the total number of laboratory tests ordered by a physician for a specific disease or disorder, and 2) Total Abnormals, which uses the total number of laboratory test results defined as abnormal.

The second parameter 605, "And", denotes an "AND" logic function. Menu 606 defines the prescriptions used in the determination of penetration opportunity. There are two or more choices from this menu. For example, the user is invited to select between: 1) Total Prescriptions (shown), which uses the total number of drug prescriptions for a specific disease ordered by a physician, and 2) Total Prescription X, where X indicates a specific drug prescribed by the physician. After a combination of parameters 604 and 606 is selected, the user may confirm the selection using the "Submit" button 607.

FIG. 7 illustrates a Penetration Opportunity Report displayed in a response to the user selection of parameters 604 and 606. Title 700, "Penetration Opportunity Report," is descriptive of the data provided on the page. Below Title 700 is a run date 701. The selected parameters used for the determination of the Penetration Opportunity Report may be displayed by caption 702 below run date 701. Options are available to return to Report Menu 703 or to View Chart 704 containing related data.

Depending on the Penetration Opportunity Report selected in FIG. 6, a custom message may be displayed above the tabular data, show as caption 705, to prompt the sales and marketing personnel for specific actions. Data in the Penetration Opportunity Report may be presented in a format selected by the user. As shown, first column 706 displays the prescribing physician's name. Physician's name 707 may be specifically selected to link the user to a screen showing Doctor Details, such as the one shown in FIG. 5, for the selected physician.

Column 708 on the Penetration Opportunity Report page displays the address of the selected physician. Column 709 shows the number of prescriptions ordered by each physician for the selected drug under inquiry. The name of the selected drug is listed at the top of the column 709 with the number of respective prescriptions for each physician below. Column 710 displays the total number of prescriptions of drugs ordered by each physician in the same therapeutic class as the selected drug. Column 711 shows the total number of tests ordered by each physician for the specific related disorder. Column 712 shows the total number of test results indicating an abnormal condition.

Column 713 displays the Penetration Opportunity as a function of the parameters selected by the user. A Penetration Opportunity 714 is displayed in numerical format, in this example with the data sorted from highest to lowest numerical value. In this manner, the user is provided with a convenient list indicating the most desirable physicians to contact listed at the top of the page, wherein those physicians listed near the top represent a greater penetration opportunity than those listed toward the bottom. In this way, the members of the sales force are empowered to target sales efforts toward those physicians that represent the greatest potential for larger consummated sales.

Penetration Opportunity 714 depends on the parameters selected by the user, as shown in FIG. 6. For example, if the user selects Total Abnormals from menu 604 in FIG. 6 and Total Prescriptions from menu 606 in FIG. 6, then Penetration Opportunity 714 is calculated by finding the difference between the data corresponding to Total Abnormals and Total Prescriptions. In the example illustrated in FIG. 7, the Total Abnormals and Total Prescriptions for Dr. Rodriguez are 45 and 32, respectively. Accordingly, Penetration Opportunity 714 subtracts Total Abnormals from Total Prescriptions, resulting in the number 13 for Dr. Rodriguez. Because Dr. Rodriguez has a larger number for Total Abnormals than for Total Prescriptions, the difference between the two represents a theoretical penetration opportunity. The penetration opportunity exists because, at the particular point(s) in time at which the data was collected with respect to Dr. Rodriguez, Dr. Rodriguez may need to order additional drug prescriptions to treat the patients for which abnormal tests were received. The sales force may, therefore, wish to target Dr. Rodriguez in the hope that a selected drug will be prescribed for those treatments. In contrast, Dr. Greenberg (with a Penetration Opportunity of −12) represents less potential.

Depending on the selection made on the menu shown in FIG. 6, there are at least four (4) possible algorithms for computing Penetration Opportunity 714: (1) Total Abnormals minus Total Prescriptions, (2) Total Abnormals minus Total Prescription X, (3) Total Tests minus Total Prescriptions, and (4) Total Tests minus Total Prescription X. Other algorithms may also be used (e.g., multiplication, addition, division, and combinations thereof) to arrive at a Penetration Opportunity value. In any event, however, the Penetration Opportunity according to an exemplary embodiment of the invention is based upon laboratory tests and drug prescriptions ordered by a physician.

FIG. 8 illustrates the Comparative Drug Outcomes selection from Menu 100. Title 800 "Comparative Drug Outcomes" is descriptive of the page. In this exemplary embodiment, the invention provides a method that analyzes the combination of drug prescription data and laboratory test data at a patient level. The patient identification associated with the laboratory test data and drug prescription data can be kept confidential by encoding processes in order to maintain patient confidentiality while allowing a combination of laboratory test data and drug prescription data at a patient level.

In the exemplary embodiment shown in FIG. 8, there are seven menu items available for selection: (1) Disease 801 prompts the user to choose from menu 804 listing various diseases, (2) Plan 802 prompts the user to choose from menu 805 containing commercially available healthcare plans, (3) Time Period 803 prompts the user to choose from menu 806 containing time periods from which data have been collected, (4) Region 807 prompts the user to choose from menu 811 containing distinct geographical regions or sales territories for marketing opportunity, (5) Physician 808 prompts the user to choose from menu 812 containing a listing of physicians, (6) Population 809 prompts the user to choose from menu 813 including patient groupings, such as adult, child, age ranges such as 25-50, etc., and (7) Drug/Dosage 810 prompts the user to choose from menu 814 including drugs and dosages of the drugs relevant to the selected drug. After the parameters of interest are selected in windows 804-806 and 811-814, the user may click on the Submit button 815 for analysis and display of the results.

Figure 9:
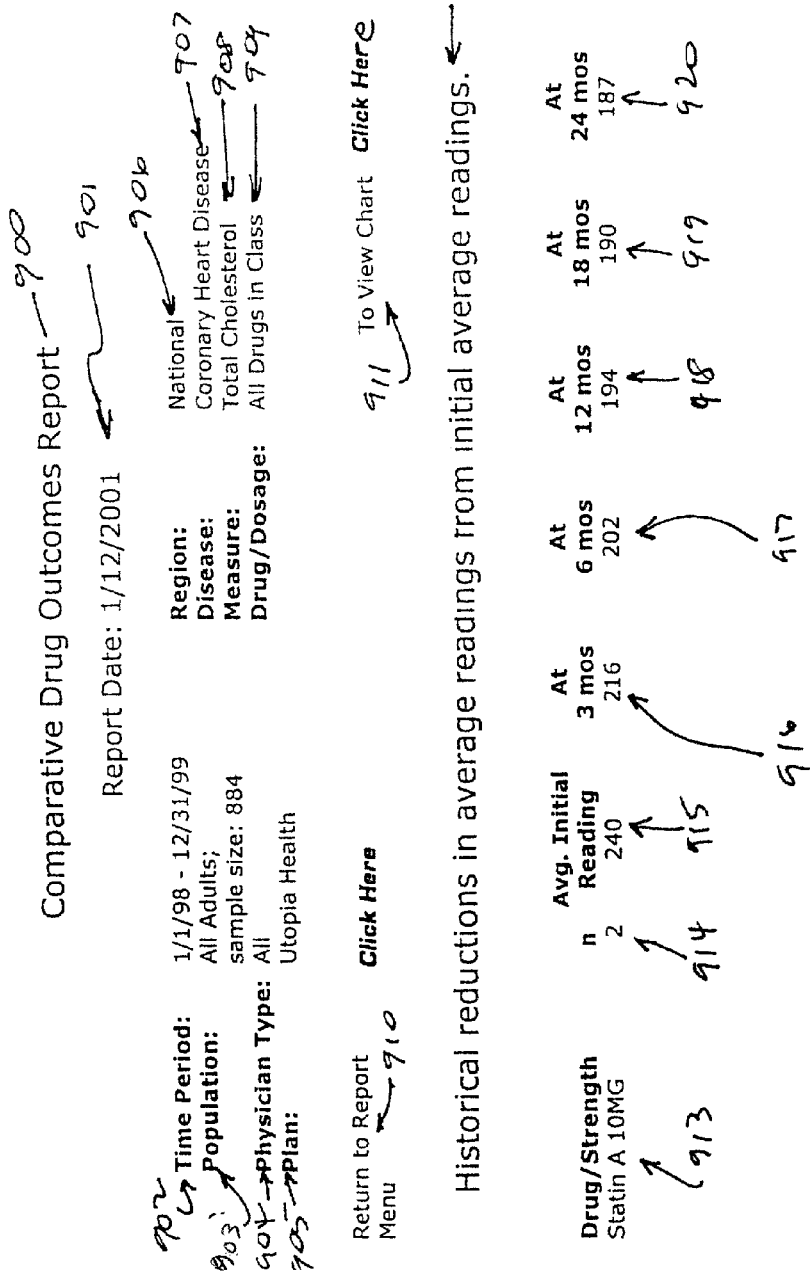
FIG. 9 is a computer screen snapshot of a page communicated to the user providing a Comparative Drug Outcomes Report in response to the selection made by the user on the page shown in FIG. 8.

FIG. 9 illustrates a Comparative Drug Outcome Report, as indicated by Title 900. Run date 901 of the report is indicated below Title 900. Options selected in windows 804-806 and 811-814 define the format and content of the report, namely the following: (1) Time Period 902, (2) Population 903, (3) Physician Type 904, (4) Plan 905, (5) Region 906, (6) Disease 907, and (7) Drug/Dosage 909. Also indicated on the page is the specific item measured by a diagnostic test associated with Disease 907, as indicated by "Measure" 908.

The second portion of the Comparative Drug Outcomes Report 900, is a presentation of data indicating historical reductions in average readings, based on the parameters selected in windows 804-806 and 811-814 of the Comparative Drug Outcomes menu page, shown in FIG. 8. This portion of the page is indicated by Title 912, "Historical Reductions in Average Readings from Initial Average Readings." First column 913 indicates a specific drug/strength combination; second column 914 indicates "n", the number of data samples used in the calculation of the average; and third column 915 displays the average initial reading for diagnostic test measurement 908 indicated in the options selected for the Comparative Drug Outcomes Report. The fourth, fifth, etc., columns (917-920 in FIG. 9) may display the average readings for diagnostic test measurement 908 at specific time intervals. For example, the user may wish to examine the trend in measurement 908 at three-month intervals, six-month intervals and so on.

In an exemplary embodiment, the databases used for correlating data and determining penetration opportunity are updated periodically, e.g., hourly, daily, weekly, monthly, etc. Alternatively, the databases are updated substantially continuously. If updated periodically, shorter periods may be preferred over longer periods to ensure that the information provided to the sales force is as current as possible. In that way, the penetration opportunity values generated for use by the sales force more accurately reflect actual marketing opportunities, approaching a "real time" scenario.

Although aspects of this invention have been described with reference to exemplary embodiments selected for illustration in the figures and variations thereof, it will be appreciated that additional variations and modifications can be made within the scope of this invention. For example, as illustrated in an exemplary embodiment, a user of the system selects physicians from one of four distinct segments based on frequency/quantity of diagnostic tests ordered and the amount of drug prescriptions ordered. Alternatively, the system can be configured such that physicians can be selected from one, two, three, five or more categories. Also, the history of a physician's ranking can be made available to users of the system. Also, in an exemplary embodiment of the invention a user of the system optionally selects a defined geographical territory from which to select physicians. A subscriber can also select physicians for analysis based on practice area, a specific drug, a class of drugs, a specific diagnostic test, an outcome of a diagnostic test, a specific disease state or disorder, or affiliation.

In an exemplary embodiment, the system according to aspects of the invention quantifies the gap between prescribing and testing volumes of a physician. Alternatively, the penetration opportunity may be based on other relationships between data for laboratory tests and data for drug prescriptions ordered by one or more physicians.

In one embodiment, a pharmaceutical or medical supply company may subscribe to a service to provide access to a system according to aspects of the invention. Such access may be provided when the user pays a set-up fee. The subscribing company may also be required to pay a licensing fee based on usage, length of subscription, or both. In a related embodiment, the user of the system may negotiate a recurring fee with the owner of the system, based on usage of the system.

In an exemplary embodiment, menus with multiple options are available to the user to select either individual or multiple options from the menu. The user may also select a specific time period over which to correlate data from the databases. These menus may take a variety of forms depending upon the preferences of the user of the system.

In an exemplary embodiment, wherever a physician's name is listed, the physician's UPIN number, or other such physician identification number, is also listed. Other means of identifying physicians can optionally be used to supplement or replace those examples described herein.

Various additional modifications may be made within the scope and range of equivalents of the claims and without departing from the spirit of the invention.

What is claimed:

1. A method of marketing prescription drugs to targeted health care professionals with comparative drug outcome reports, said method comprising the steps of:

collecting, by a processor, data on at least one laboratory test, including abnormal results from the at least one laboratory test;

matching, by a processor, the collected laboratory test data with respective patients;

collecting, by a processor, data on ordered drug prescriptions for the respective patients;

correlating, by a processor, the matched laboratory test data with the collected drug prescription data for the respective patients at a set of intervals to develop comparative drug outcomes;

collecting, by a processor, data on at least one health care professional that ordered at least one drug prescription and at least one laboratory test correlated in the previous step;

identifying at least one health care professional that ordered at least one less drug prescription than laboratory tests with abnormal results; and targeting the at least one identified health care professional to receive the developed comparative drug outcomes.

2. The method of claim 1 comprising presenting the correlated health care professional data by at least one of a region, a physician, a plan, a population or a disease.

3. The method of claim 1 comprising:

receiving a selection of a time period, a dosage of an ordered drug, a region, a physician, a plan, a population, a disease or a combination thereof; and correlating the collected data with the corresponding data on the ordered drug prescriptions responsive to the selection.

4. The method of claim 1 comprising receiving a selection of a time period, a dosage on an ordered drug, a region, a physician, a plan, a population, a disease, or a combination thereof, wherein the collecting data on at least one laboratory test step comprises collecting data on the laboratory tests responsive to the selection.

5. The method of claim 3 comprising generating a report responsive to the selection.

6. The method of claim 1 comprising:

generating a report indicating the ordered drug prescription, a dosage of the ordered drug prescription, a number of data samples used for generating the report, the laboratory test measurement values or a combination thereof corresponding to the collected data on the laboratory tests.

7. The method of claim 1, wherein the correlating of the matched laboratory test data with the collected drug prescription data for the respective patients includes determining expected laboratory test results at the set of intervals after a drug or drug class is prescribed to a patient based on the data on the laboratory tests and the correlated drug prescriptions at a patient level.

8. The method of claim 7, wherein the step of determining expected laboratory test results comprises:

correlating, by a processor, data on laboratory tests and data on ordered drug prescriptions;

selecting a drug or a drug class for presentation;

generating, by the processor, a series of diagnostic test measurement values at a set of intervals based on the data on the correlated laboratory tests and the ordered drug prescriptions; and determining the expected laboratory test results at the set of intervals after the selected drug or the selected drug class is prescribed.

9. The method of claim 1 wherein patient confidentiality is maintained by encoding patient identification information in a manner that prevents identification of individual patients.

10. The method of claim 1, wherein the identifying step comprises:

correlating, by a processor, the collected health care professional data with the matched laboratory test data and the ordered drug prescription data.

* * * * *